Aug. 25, 1942.          L. G. CRANE ET AL          2,294,160
               GLASS PIPE AND COUPLING THEREFOR
                  Filed May 4, 1940          2 Sheets-Sheet 1
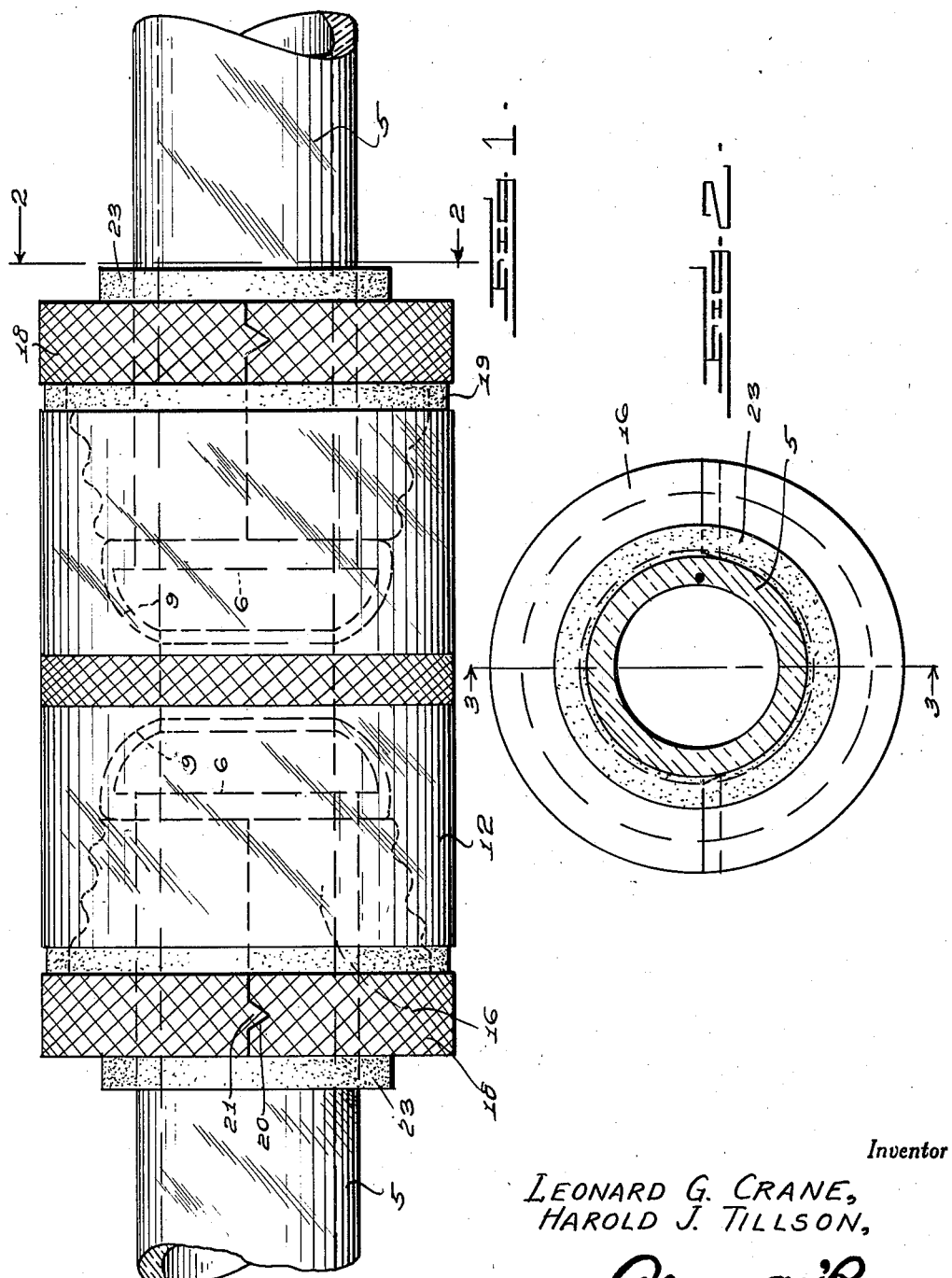
Inventor
LEONARD G. CRANE,
HAROLD J. TILLSON,
By  Clarence A. O'Brien
Attorney Aug. 25, 1942.   L. G. CRANE ET AL   2,294,160
GLASS PIPE AND COUPLING THEREFOR
Filed May 4, 1940   2 Sheets-Sheet 2
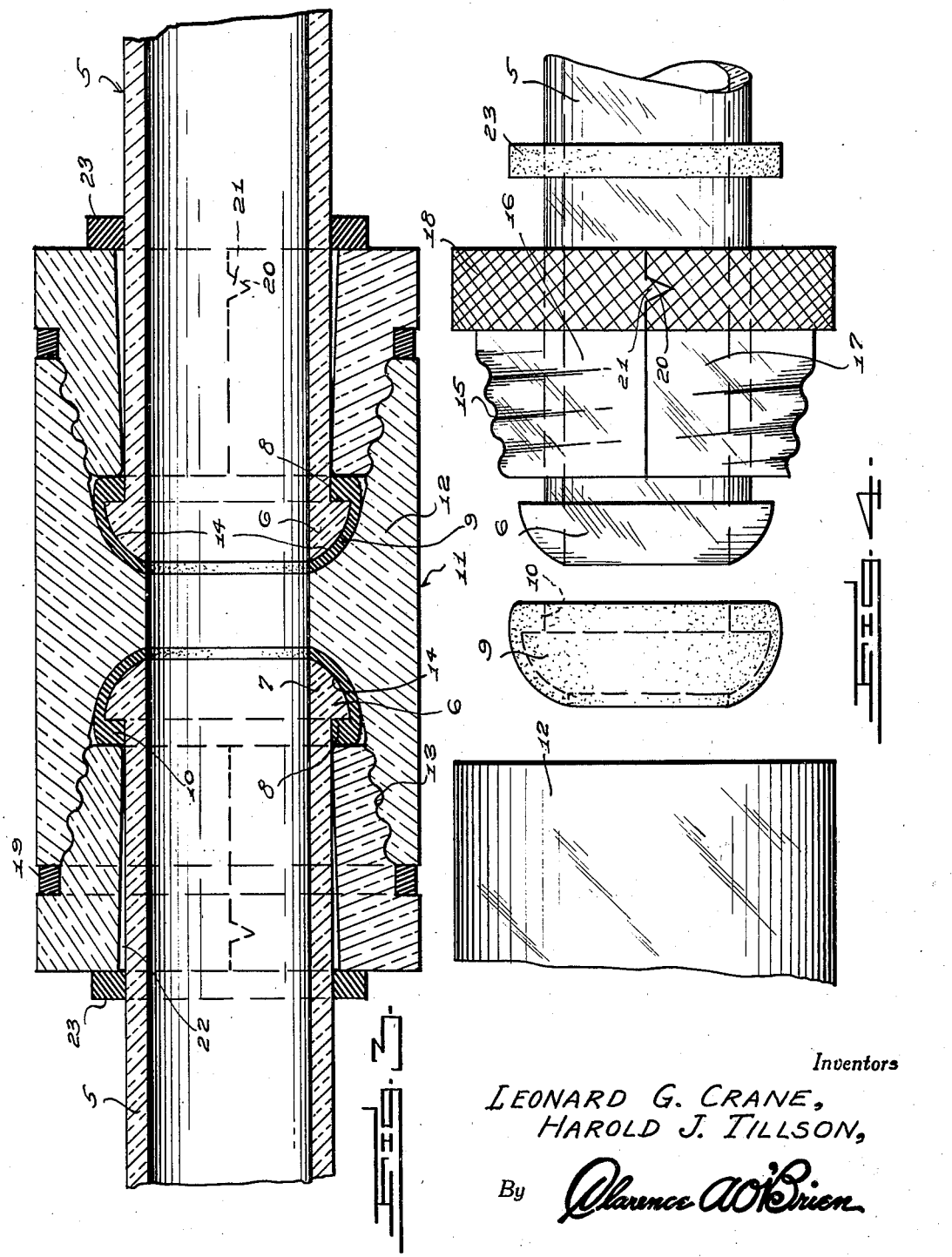
Inventors
LEONARD G. CRANE,
HAROLD J. TILLSON,
By *Clarence A. O'Brien*
Attorneys Patented Aug. 25, 1942

2,294,160

UNITED STATES PATENT OFFICE 2,294,160

GLASS PIPE AND COUPLING THEREFOR

Leonard G. Crane, Oneonta, and Harold J. Tillson, Morris, N. Y.

Application May 4, 1940, Serial No. 333,418

2 Claims. (Cl. 285—196)

The present invention relates to new and useful improvements in pipe and pipe couplings and has for its primary object to provide a coupling device for glass pipes to prevent corrosion of the pipe as well as the coupling when used as a conduit for acids, chemicals and similar substances and also to enable the pipe to be laid on the ground without danger of deterioration.

A further object of the invention is to provide a non-corrosive pipe and coupling therefor which is simple and practical in construction, relatively inexpensive to manufacture and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout, and in which—

Figure 1 is a side elevational view,

Figure 2 is a transverse sectional view taken substantially on a line 2—2 of Figure 1, Figure 3 is a longitudinal sectional view taken substantially on a line 3—3 of Figure 2, and Figure 4 is a side elevational view of the several parts forming the coupling.

Referring now to the drawings in detail, the numeral 5 designates a pair of glass pipe sections, the end of each section being formed with a head 6 having a rounded end portion as shown at 7 and a shoulder 8 at the junction of the head with the pipe.

The head 6 is adapted to receive a rubber packing cap 9 which is shaped to conformably receive the head, the outer end of the cap being open to permit unobstructed passage through the pipe. The inner end of the cap is formed with an inturned flange 10 to receive the shoulder 8 of the head.

The sections of the pipe are connected in end to end relation by means of a coupling member designated generally at 11 which includes a tubular body portion 12 of glass or similar non-corrosive material, each end of the member being formed with a conical recess 13 terminating in a concaved seat 14 adapted to conformably receive the head 6 and packing cap 9. The walls of the recess 13, outwardly of the seat 14, are internally threaded and adapted to threadedly receive a longitudinally split packing nut 15.

The packing nut is formed of a pair of longitudinally split sections 16 and 17 of tapering formation to threadedly engage the threaded portion of the recess 13. The outer end of the packing nut is formed with a knurled flange 18 to facilitate gripping of the nut for threading into and out of engagement with the recess 13. A rubber packing washer 19 is interposed between the flange 18 and the adjacent end of the body 12 of coupling member.

One split edge of the packing nut, in the flange portion thereof, is formed with a V-notch 20, formed in the section 17 of the packing nut while the split edge of the section 16 of the packing nut is formed with a V-shaped lug 21 adapted to conformably seat in the notch 20 to prevent relative longitudinal movement of the sections during the manipulation of the nut.

The bore of the packing nut 15 is flared outwardly as shown at 22 to provide a loose fit for the pipe 5 therein, and a rubber sealing ring 23 is mounted on the pipe for abutting the outer end of the nut to cover the space thus formed between the pipe and the bore of the packing nut to prevent the entrance of dirt and dust therein.

The loose fit of the pipe in the packing nut permits the removal of one of the pipe sections by only a partial removement of the packing nut from an adjacent pipe section.

It will be apparent from the foregoing that the packing cap 9 and the packing nut 15 cooperate to form a liquid tight fit for the head 6 of the pipe in the coupling and since the packing nut 15 and body 12 of the coupling, as well as the pipe sections 5 are constructed of glass, a non-corrosive pipe and coupling structure is provided.

It is believed the details of construction and advantages of such a device will be readily apparent from the foregoing without further detailed explanation.

Having thus described the invention, what we claim is:

1. A pipe union comprising a tubular body having flared bores at each end, said bores being threaded at their outer ends and provided with concaved seats at their inner ends, the bores at the respective ends of the body having communication through the bases of said seats, pipes having rounded heads having an annular shoulder at their inner ends, a resilient cover enclosing each head and forming a packing between the head and the seat, packing nuts threaded in said bores, said nuts being engaged behind said shoulders to urge the heads into a seating position within the seats of the body, and said nuts having an outwardly flared bore to permit limited transverse movement of the pipe in the outer end of the nuts, said packing having inwardly projecting portions engaged behind the shoulders and interposed between the shoulders and the inner ends of the nuts, and resilient packing rings on the pipes abutting the outer ends of the nuts.

2. A pipe union comprising a tubular body having flared bores at each end, said bores being threaded at their outer ends and provided with concaved seats at their inner ends, the bores at the respective ends of the body having communication through the bases of said seats, pipes having rounded heads conformably fitted in said seats, shoulders on the inner ends of the heads, a resilient member covering each head and having inturned flanges engaging behind the shoulders of the head, and tapering packing nuts threaded in said bores and having their inner ends abutting said flanges of the resilient member to protect the heads from the nuts.

LEONARD G. CRANE.
HAROLD J. TILLSON.